(12) United States Patent
Kim et al.

(10) Patent No.: US 10,356,799 B2
(45) Date of Patent: Jul. 16, 2019

(54) SCHEDULING METHOD AND APPARATUS OF WIRELESS COMMUNICATION SYSTEM

(71) Applicant: Samsung Electronics Co., Ltd., Suwon-si, Gyeonggi-do (KR)

(72) Inventors: Yohan Kim, Yongin-si (KR); Song Chong, Daejeon (KR); Eunyong Kim, Yongin-si (KR); Joseph Jeon, Seongnam-si (KR); Okyoung Choi, Daejeon (KR); Changsik Lee, Daejeon (KR)

(73) Assignees: Samsung Electronics Co., Ltd., Suwon-si (KR); Korea Advanced Institute of Science and Technology, Dajeon (KR)

( * ) Notice: Subject to any disclaimer, the term of this patent is extended or adjusted under 35 U.S.C. 154(b) by 77 days.

(21) Appl. No.: 15/158,098

(22) Filed: May 18, 2016

(65) Prior Publication Data

US 2016/0353464 A1 Dec. 1, 2016

(30) Foreign Application Priority Data

May 28, 2015 (KR) .......................... 10-2015-0075384

(51) Int. Cl.

| | |
|---|---|
| *H04W 4/00* | (2018.01) |
| *H04W 72/12* | (2009.01) |
| *H04L 29/06* | (2006.01) |
| *H04L 12/40* | (2006.01) |
| *H04L 12/46* | (2006.01) |
| *H04W 28/16* | (2009.01) |
| *H04W 88/08* | (2009.01) |

(52) U.S. Cl.
CPC ............ *H04W 72/12* (2013.01); *H04L 12/40* (2013.01); *H04L 12/46* (2013.01); *H04L 29/0653* (2013.01); *H04W 28/16* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 8,670,419 B2* | 3/2014 | Chin ..................... | H04L 5/0007 370/336 |
| 9,560,668 B1* | 1/2017 | Sevindik ........... | H04W 72/1231 |
| 2002/0183064 A1* | 12/2002 | Gopalakrishnan .. | H04W 52/265 455/452.1 |

(Continued)

FOREIGN PATENT DOCUMENTS

KR 10-1384125 B1 4/2014

*Primary Examiner* — Bob A Phunkulh
(74) *Attorney, Agent, or Firm* — Jefferson IP Law, LLP

(57) ABSTRACT

A method and an apparatus for effectively determining a terminal which will transmit or receive packets in a packet-based wireless network are provided. The scheduling method of a base station of a wireless communication system includes determining a first status variable for an increment of whole network utility to data amount allocated to at least one terminal and a second status variable for an increment of the whole network utility to a scheduling chance allocated to the terminal, determining a scheduling metric based on the first and second status variables, and scheduling the at least one terminal based on the scheduling metric.

15 Claims, 8 Drawing Sheets

(56) References Cited

U.S. PATENT DOCUMENTS

| | | | | |
|---|---|---|---|---|
| 2003/0104817 A1* | 6/2003 | Damnjanovic | H04W 72/1226 | 455/452.1 |
| 2004/0082364 A1* | 4/2004 | Kitazawa | H04L 47/14 | 455/560 |
| 2005/0025090 A1* | 2/2005 | Klein | H04L 47/10 | 370/328 |
| 2005/0063389 A1* | 3/2005 | Elliott | H04L 12/1881 | 370/395.4 |
| 2005/0094675 A1* | 5/2005 | Bhushan | H04W 48/08 | 370/527 |
| 2006/0002360 A1* | 1/2006 | Ji | H04W 72/1231 | 370/343 |
| 2006/0285522 A1* | 12/2006 | Kim | H04L 47/14 | 370/331 |
| 2008/0069046 A1* | 3/2008 | Ishii | H04L 47/14 | 370/330 |
| 2008/0186931 A1* | 8/2008 | Prakash | H04W 28/24 | 370/338 |
| 2008/0198814 A1* | 8/2008 | Wengerter | H04L 47/14 | 370/336 |
| 2009/0051592 A1* | 2/2009 | Lee | H04B 7/0408 | 342/368 |
| 2009/0059860 A1* | 3/2009 | Maltsev | H04W 72/1236 | 370/330 |
| 2009/0285196 A1* | 11/2009 | Lee | H04L 47/14 | 370/345 |
| 2010/0046444 A1* | 2/2010 | Lin | H04L 47/14 | 370/329 |
| 2010/0234033 A1* | 9/2010 | Iwamura | H04L 1/0021 | 455/450 |
| 2011/0130099 A1* | 6/2011 | Madan | H04W 72/1226 | 455/63.1 |
| 2011/0170513 A1* | 7/2011 | Seo | H04W 72/1252 | 370/329 |
| 2013/0046889 A1* | 2/2013 | Tulino | H04W 72/121 | 709/225 |
| 2013/0059595 A1* | 3/2013 | Okubo | H04W 72/1242 | 455/452.1 |
| 2013/0090055 A1* | 4/2013 | Pitakdumrongkija | H04B 7/15 | 455/9 |
| 2013/0157678 A1* | 6/2013 | Kim | H04W 72/048 | 455/452.1 |
| 2013/0163540 A1* | 6/2013 | Roh | H04W 72/085 | 370/329 |
| 2013/0163541 A1* | 6/2013 | Roh | H04W 72/04 | 370/329 |
| 2013/0195053 A1* | 8/2013 | Jeon | H04W 72/0406 | 370/329 |
| 2014/0126359 A1* | 5/2014 | Sarkar | H04W 72/087 | 370/230 |
| 2014/0334459 A1* | 11/2014 | Larsson | H04B 7/0413 | 370/336 |
| 2015/0063498 A1* | 3/2015 | Jalloul | H04L 27/2649 | 375/340 |
| 2015/0098438 A1* | 4/2015 | Nammi | H04W 24/10 | 370/330 |
| 2015/0117352 A1* | 4/2015 | Nammi | H04L 12/00 | 370/329 |
| 2015/0189540 A1* | 7/2015 | Jung | H04W 28/0268 | 370/230 |
| 2015/0319772 A1* | 11/2015 | Halabian | H04W 72/1273 | 370/329 |
| 2016/0014785 A1* | 1/2016 | Benjebbour | H04W 52/241 | 370/329 |
| 2016/0044526 A1* | 2/2016 | Pawar | H04W 28/0226 | 370/230 |
| 2016/0142193 A1* | 5/2016 | Benjebbour | H04J 11/0043 | 370/329 |
| 2016/0174230 A1* | 6/2016 | Benjebbour | H04W 52/346 | 370/329 |

* cited by examiner

SCHEDULING METHOD AND APPARATUS OF WIRELESS COMMUNICATION SYSTEM

CROSS-REFERENCE TO RELATED APPLICATION(S)

This application claims the benefit under 35 U.S.C. § 119(a) of a Korean patent application filed on May 28, 2015 in the Korean Intellectual Property Office and assigned Serial number 10-2015-0075384, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) KOREA ADVANCED INSTITUTE OF SCIENCE AND TECHNOLOGY.

TECHNICAL FIELD

The present disclosure relates to a wireless communication system. More particularly, the present disclosure relates to a method and apparatus for effectively determining a terminal which will transmit or receive packets in a packet-based wireless network.

BACKGROUND

Mobile communication systems were developed to provide the subscribers with voice communication services on the move. Recently, mobile communication systems have evolved to the level of supporting high speed data communication services beyond the early voice-oriented services. However, resource shortages and user requirements for higher speed services have spurred evolution towards increasingly more advanced mobile communication systems.

As one of the next-generation mobile communication systems to meet such requirements, the long term evolution (LTE) system is being standardized in the 3rd generation partnership project (3GPP). LTE is a technology designed to provide high speed packet-based communication of up to 100 Mbps. In order to accomplish this goal, discussions are being held on several schemes. One scheme is for reducing the number of nodes located in a communication path by simplifying a configuration of the network and another scheme is for maximally approximating wireless protocols to wireless channels.

Accordingly, there is a need for a method and apparatus for effectively determining a terminal that will transmit or receive packets in packet-based wireless communication networks.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for scheduling terminals in consideration of various types of quality of service (QoS).

In accordance with an aspect of the present disclosure, a scheduling method of a base station of a wireless communication system is provided. The scheduling method includes determining a first status variable for an increment of whole network utility to a data amount allocated to at least one terminal and a second status variable for an increment of the whole network utility to a scheduling chance allocated to the terminal, determining a scheduling metric based on the first and second status variables, and scheduling the at least one terminal based on the scheduling metric.

In accordance with another aspect of the present disclosure, a base station of a wireless communication system is provided. The base station includes a communication unit configured to transmit and receive signals and a controller configured to decrease the first status variable and increase the second status variable when the first status variable is equal to or greater than the second status variable, increase the first status variable and maintain the second status variable when the first status variable is less than the second status variable, determine an increment of the first status variable to be proportional to an adjustment variable for determining a priority between QoS guarantee and resource allocation fairness and inversely proportional to a difference between the first and fourth status variables, and determine, when the terminal is scheduled, to decrease the second status value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
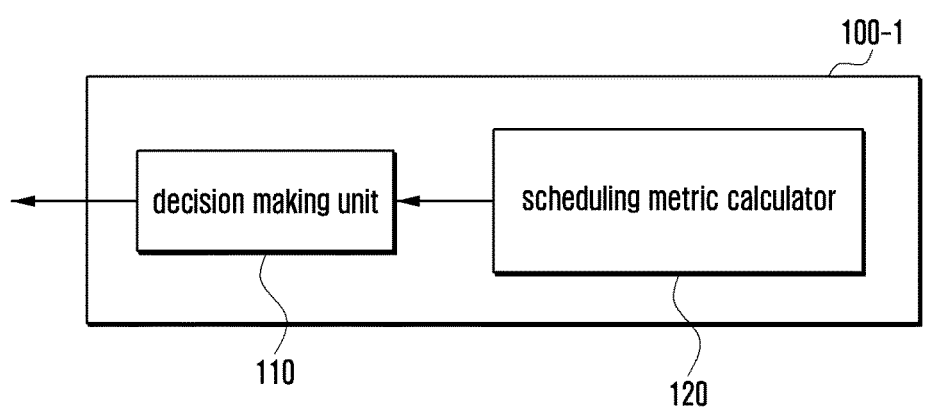
FIGS. 1A, 1B, and 1C are block diagrams illustrating configurations of a scheduler according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the following description is directed to the advanced evolved universal terrestrial radio access (E-UTRA) (or long term evolution-advanced (LTE-A)) system supporting carrier aggregation (CA), it will be understood by those skilled in the art that the present disclosure can be applied even to other communication systems having a similar technical background and channel format, with a slight modification, without departing from the spirit and scope of the present disclosure. For example, the present disclosure can be applied to a CA-enabled multicarrier high speed packet access (HSPA) system.

For the same reason, some of the elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the various embodiments set forth herein. Rather, these various embodiments are provided so that this disclosure will convey the concept of the disclosure to those skilled in the art, and the present disclosure will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to functions thereof.

The term "module" according to the various embodiments of the disclosure, means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

Figure 1B:
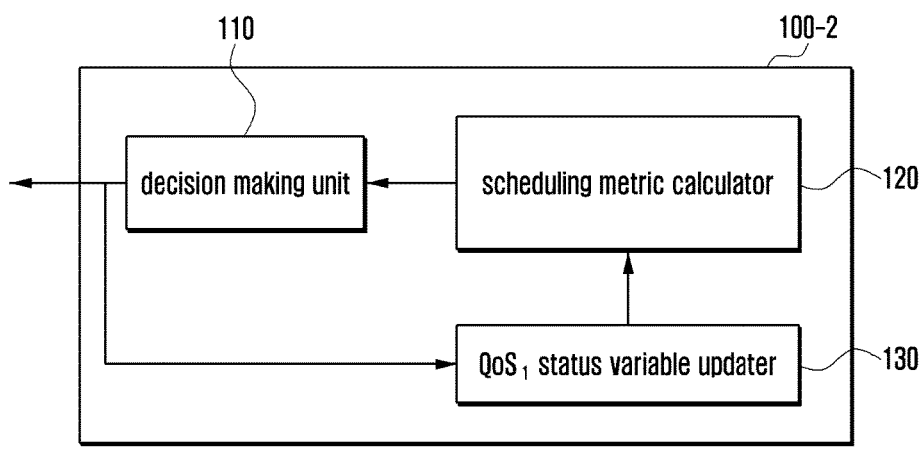
Figure 1C:
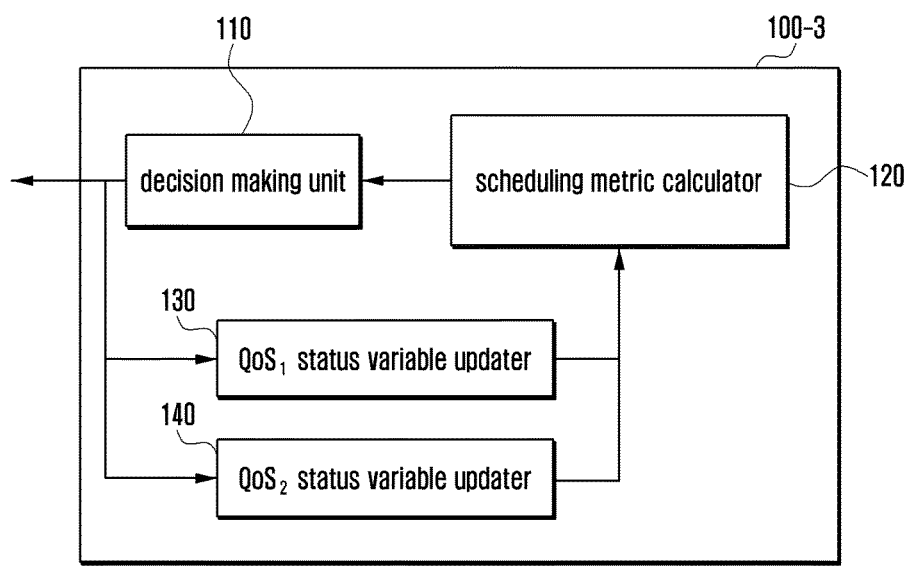

FIGS. 1A to 1C are block diagrams illustrating configurations of a scheduler according to various embodiments of the present disclosure.

Referring to FIG. 1A, the scheduler 100-1 of a base station may include a decision making unit 110 and a scheduling metric calculator 120.

The decision making unit 110 may allocate resources to at least one terminal according to a scheduling metric value corresponding thereto.

The scheduling metric calculator 120 may calculate the scheduling metric for allocating resources to the at least one terminal according to a predetermined algorithm.

In the embodiment of FIG. 1A, the scheduler 100-1 may aim to maximize throughput. Accordingly, the scheduling metric calculator 120 may calculate a signal-to-interference plus noise ratio (SINR) value as the scheduling metric value for at least one terminal. The SINR value for the at least one terminal may be replaced by a ratio of data amount available per terminal.

The decision making unit 110 may allocate resources to the terminals having relatively large metric values.

Referring to FIG. 1B, the scheduler 100-2 may include a decision making unit 110, a scheduling metric calculator 120, and a quality of service 1 (QoS 1) status variable updater 130.

In the embodiment of FIG. 1B, the scheduler 100-2 may aim to achieve fairness to the terminals as well as maximize the throughput. Since the throughput fairness is one of QoS conditions, the scheduler 100-2 may reflect the fairness QoS condition to the scheduling.

For example, the fairness may be a scheduling condition for the scheduler 100-2 to maximize whole network utility. The whole network utility is a value for representing how fairly the resources are allocated and may denote transmitting data as much as possible to the terminal while allocating resources to at least one terminal as fairly as possible.

The whole network utility may be calculated by Equation 1:

$$\text{Utility} = \sum_i \log R_i \qquad \text{Equation 1}$$

In Equation 1, $R_i$ denotes the average throughput of terminal i.

The $QoS_1$ status variable updater 130 of the scheduler 100-2 may calculate $R_i$ value in a way of maximizing the whole network utility using Equation 2:

$$R_i(t) = \left(1 - \frac{1}{W}\right) R_i(t-1) + \frac{1}{W} \cdot 1_i \cdot R_i(t) \qquad \text{Equation 2}$$

The scheduling metric calculator 120 of FIG. 1B may calculate the scheduling metric using Equation 3:

$$\text{metric}_i = \frac{\mu_i(t)}{R_i(t)} \qquad \text{Equation 3}$$

In Equation 3, $\mu_i(t)$ denotes an instant data channel transfer rate at time t, i.e. data amount or transmission efficiency of the scheduler 100-2 at time t. $R_i(t)$ denotes an average data channel transfer rate, i.e. average throughput calculated in consideration of $R_i(t)$ and where to allocate resources. $R_i(t)$ may also be determined by the $QoS_1$ status variable updater 130. The average value of $R_i(t)$ may be updated in a window as shown in Equation 2, and W denotes the size of the window.

Meanwhile, the $QoS_1$ status variable updater 130 may be affected by the resource allocation result of the decision making unit 110. For example, $1_i$ is set to 1 for the case where resources are scheduled for terminal i and 0 for the case where no resource is scheduled for terminal i. Since Equation 2 for calculating the $QoS_1$ status variable $R_i(t)$ includes $1_i$, it is possible to known that the $QoS_1$ status variable updater 130 is affected by the resource allocation result of the decision making unit 110.

Referring to FIG. 1C, the scheduler 100-3 may be a scheduler which further considers a delay QoS. For example, the scheduler 100-3 may be a modified largest weighted delay first (MLWDF) scheduler.

The scheduler 100-3 may include a $QoS_2$ status variable updater 140 in addition to the decision making unit 110, the scheduling metric calculator 120, and $QoS_1$ status variable updater 130.

The $QoS_2$ status variable updater 140 may calculate a status variable for delay QoS using Equation 4:

$$D_i(t) = D_i(t-1) + \tau \qquad \text{Equation 4}$$

In Equation 4, $\tau$ denote a unit time. Accordingly, Equation 4 shows that the delay at time t increases as much as $\tau$ as compared with the delay at time t−1.

The scheduling metric calculator 120 may calculate the scheduling metric based on the $D_i(t)$ value received from the $QoS_2$ status variable updater 140.

$$\text{metric}_i = \frac{\mu_i(t)}{R_i(t)} \cdot \frac{D_i(t)}{DB_i} \qquad \text{Equation 4}$$

$D_i(t)$ denotes delay during the period between arrival of a packet and time t, and $DB_i$ denotes a delay budget as an upper limit of allowed delay.

According to Equation 5, as the delay becomes closer to $DB_i$, i.e. the upper limit, the scheduling metric value calculated by the scheduling metric calculator 120 increases.

The decision making unit 110 may allocate resources to the terminals having large scheduling metrics. Accordingly, the $QoS_2$ status variable updater 110 may calculate the delay value for the terminals to which the decision making unit 110 allocates no resource so as to increase the delay as much as unit time $\tau$.

If there are QoS requirements, the schedulers 100-1, 100-2, and 100-3 of FIGS. 1A to 1C may calculate the scheduling metric according to the QoS status variables representing the QoS requirements for resource allocation.

Recently, with the popularity of smart terminals, it is likely that various types of traffic coexist in the network of a base station. However, the schedulers 100-1, 100-2, and 100-3 configured as shown in FIGS. 1A to 1C will have difficulty in supporting effectively the QoS requirements of all types of such traffic. For example, because the schedulers 100-1, 100-2, and 100-3 of FIGS. 1A to 1C use the QoS status variables independently, it is difficult to adjust the QoS requirements therebetween.

A description is made hereinafter of a scheduler capable of supporting effectively various QoS requirements with reference to FIG. 2.

Figure 2:
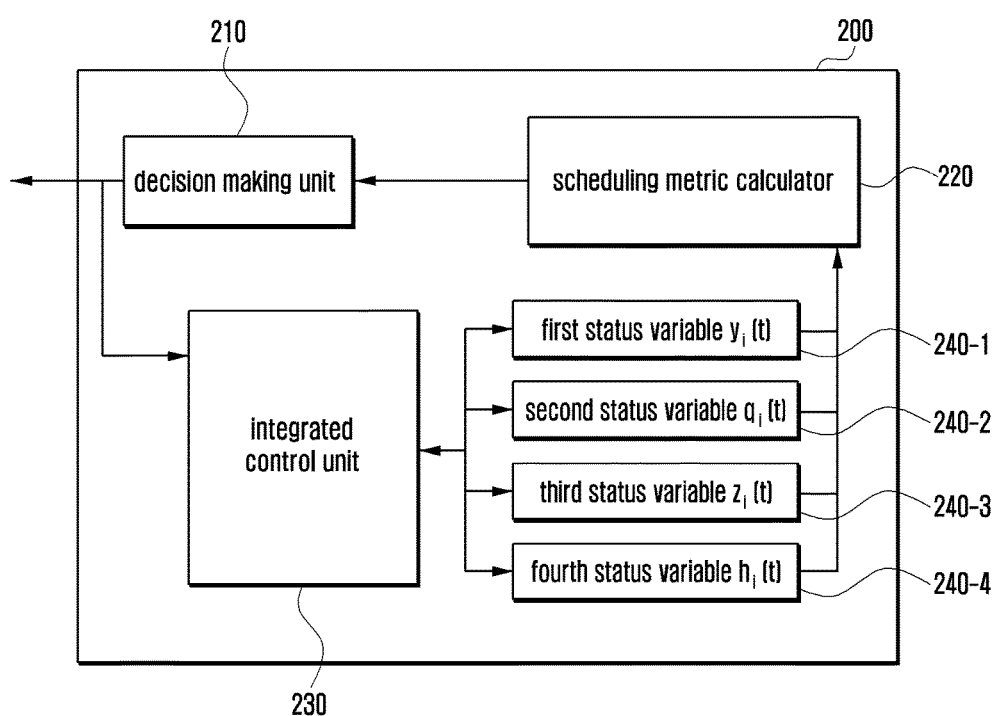
FIG. 2 is a block diagram illustrating a configuration of a scheduler according to an embodiment of the present disclosure.

FIG. 2 is a block diagram illustrating a configuration of a scheduler according to an embodiment of the present disclosure.

Referring to FIG. 2, in order to achieve the above object, the scheduler 200 may include an integrated control unit 230. The integrated control unit 230 may manage the QoS status variables corresponding to the various QoSs in an integrated manner to maximize the throughput. For example, by applying the resource allocation result output by a decision making unit 210 at time t, the integrated control unit 230 may control to change the QoS status variable in consideration of the correlation with other QoS status variables rather than changing the QoS status variables immediately at time t+1.

Accordingly, the integrated control unit 230 may configure the relationship between the QoS status variables corresponding to the QoSs and update the QoS status variables at time t+1 based on the resource allocation result output by the decision making unit 210 at time t and the relationship between the QoS status variables.

According to an embodiment of the present disclosure, the scheduler 200 of FIG. 2 may use a first to a fourth status variable to which at least one of throughput fairness QoS, delay QoS, and minimum data rate QoS is applied. The first to fourth status variables may be stored in at least one terminal.

In the following description, the first to fourth status variables 240-1 to 240-4 for terminal i at time t are defined as $y_i(t)$, $q_i(t)$, $z_i(t)$, and $h_i(t)$, respectively.

The first status variable 240-1 of $y_i(t)$ is a variable representing the increment of the whole network utility to the data amount allocated to terminal 1. For example, the first status variable 240-1 of $y_i(t)$ is a status variable for reflecting throughput fairness QoS and minimum data rate QoS.

The second status variable 240-2 of $q_i(t)$ is a variable representing the increment of the whole network utility to the scheduling chance allocated to terminal i. For example, the second status variable 240-2 of $q_i(t)$ is a status variable for reflecting the throughput fairness QoS.

According to an embodiment of the present disclosure, a scheduling metric calculator 220 may calculate a scheduling metric based on the first and second status variables 240-1 and 240-2, i.e. $y_i(t)$ and $q_i(t)$.

The third status variable 240-3 of $z_i(t)$ is a variable for representing the increment of the whole network utility to the resources amount allocated for reducing packet delay of terminal i. For example, the third status variable 240-3 of $z_i(t)$ is a status variable for reflecting the delay QoS.

According to an embodiment of the present disclosure, the scheduling metric calculator 220 may calculate the scheduling metric based on the first to third status variables 240-1 to 240-3, i.e. $y_i(t)$, $q_i(t)$, and $z_i(t)$.

The fourth status variable 240-4 of $h_i(t)$ is a variable for representing the increment of the whole network utility to the throughput required for fulfilling the minimum data rate of terminal i. For example, the fourth status variable 240-4 of $h_i(t)$ is a status variable for reflecting the minimum data rate QoS.

According to an embodiment of the present disclosure, the scheduling metric calculator 220 may calculate the scheduling metric based on the first to fourth status variables 240-1 to 240-4, i.e. $y_i(t)$, $q_i(t)$, $z_i(t)$, and $h_i(t)$.

Figure 3:
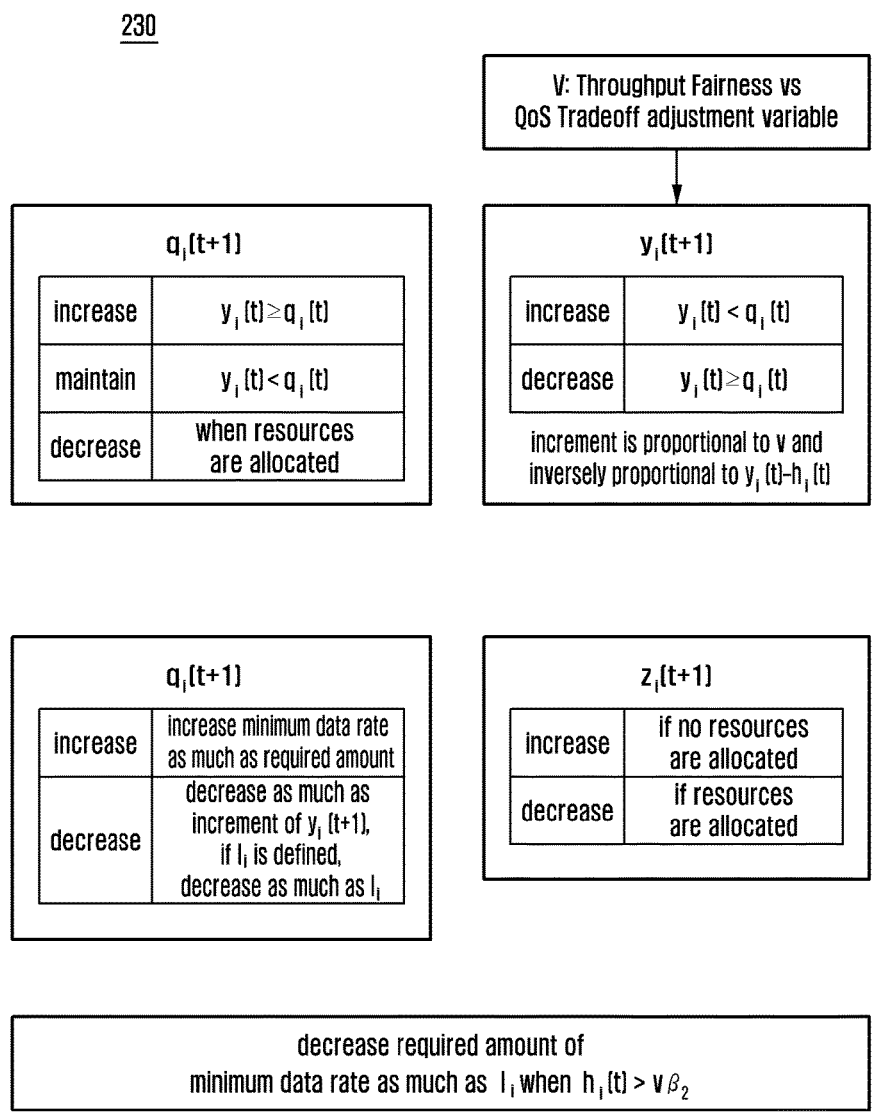
FIG. 3 is a diagram illustrating an operation mechanism of an integrated controller included in the scheduler according to an embodiment of the present disclosure.

FIG. 3 is a diagram illustrating an operation mechanism of an integrated controller included in the scheduler according to an embodiment of the present disclosure.

Referring to FIG. 3, a description is made hereinafter of a method for the integrated control unit 230 to manage a plurality of status variables integrally to determine the status variable values at time t+1 using the status variable values at time t.

By taking notice of the first status variable 240-1 of $y_i(t)$ indicating the increment of the whole network utility to the data allocation amount and the second status variable 240-2 of $q_i(t)$ indicating the increment of the whole network utility to the scheduling chance, the integrated control unit 230 can achieve the fairness of data allocation amount by reducing the value of the first status variable 240-1 of $y_i(t)$ when the first status variable 240-1 (i.e. $y_i(t)$) is greater than the second status variable 240-2 (i.e. $q_i(t)$). The integrated control unit 230 may control to increase the second status variable 240-2 ($q_i(t)$) in order for the terminal to have a scheduling chance.

Otherwise, if the first status variable 240-1 (i.e. $y_i(t)$) is less than the second status variable 240-2 ($q_i(t)$), the integrated control unit 230 may control to increase the first status variable 240-1 ($y_i(t)$) for increase of the data allocation amount to the terminal and to maintain the second status variable 240-2 ($q_i(t)$) for maintaining the fairness of scheduling chance to the terminal.

The integrated control unit 230 my control such that the increment of the first status variable 240-1 ($y_i(t)$) is proportional to an adjustment variable (V) of determining priority between QoS guarantee and resource allocation fairness and inversely proportional to the difference between the first status variable 240-1 ($y_i(t)$) and the second status variable 240-2 ($h_i(t)$).

The second status variable 240-2 ($q_i(t)$) indicates the fairness of scheduling chance to the terminal; thus, the integrated control unit 230 may guarantee scheduling fairness to the scheduled terminal with allocated resources by decreasing the value of the second status variable 240-2 ($q_i(t)$).

The third status variable 240-3 is a variable for guaranteeing delay QoS. Since the delay increases when the terminal is not allocated resources, the integrated control unit 230 may increase the third status variable 240-3 ($z_i(t)$) to increase resource allocation priority of the terminal.

If the delay is resolved with resource allocation to the terminal, the integrated control unit 230 may decrease the third status variable 240-3 ($z_i(t)$) to decrease resource allocation priority of the terminal.

The fourth status variable 240-4 ($h_i(t)$) is a variable for guaranteeing the minimum data rate. Accordingly, if the minimum data rate is not fulfilled at the terminal, the integrated control unit 230 may control to increase the fourth status variable 240-4 ($h_i(t)$) for the terminal.

Otherwise, if the minimum data rate is fulfilled at the terminal, the integrated control unit 230 may control to decrease the fourth status variable ($h_i(t)$) for the terminal.

The integrated control unit 230 may also control to increase the increment of the first status variable 240-1 ($y_i(t)$) for the case where the difference between the first status variable 240-1 ($y_i(t)$) and the fourth status variable 240-4 ($h_i(t)$) is small and to decrease the increment of the first status variable 240-1 ($y_i(t)$) for the case where the difference between the first status variable 240-1 ($y_i(t)$) and the fourth status variable 240-4 ($h_i(t)$) is large in order to allocate more resources to the terminal which does not fulfil the minimum data rate.

Meanwhile, the integrated control unit 230 may drop, when Inequality 6 is fulfilled, the packets and reduce, when Inequality 7 is fulfilled, the required amount of the minimum data rate as much as L.

$$q_i(t)+z_i(t)>V\beta_1 \qquad \text{Inequality 6}$$

$$h_i(t)>V\beta_2 \qquad \text{Inequality 7}$$

In Inequalities 6 and 7, $\beta_1$ and $\beta_2$ are constants for maximizing throughput, and they are determined by the base station. For example, the base station may determine $\beta_1$ and $\beta_2$ so as to maximize the scheduling efficiency at time t+1 based on the resource allocation result made at time t.

Returning to FIG. 2, descriptions are made of the components constituting the scheduler 200 with reference thereto. The scheduling metric calculator 220 of the scheduler may calculate a scheduling metric using Equation 8:

$$\text{metric}_i=(q_i(t)+z_i(t))\mu_i(t) \qquad \text{Equation 8}$$

The decision making unit 210 may allocate resources based on the scheduling metric value calculated by the scheduling metric calculator 220. For example, the decision making unit 210 may allocate resources to the terminals having a large increment of network utility to scheduling chance, low QoS satisfaction probability due to the increase of delay, and good channel quality in consideration of the scheduling metric.

The scheduler may maximize the whole network utility of the terminals and achieve the delay QoS and minimum data rate QoS averagely.

Meanwhile, the scheduler 200 may use only the first and third status variables 240-1 to 240-3 (($y_i(t)$, $q_i(t)$, and $z_i(t)$) in order to achieve the aim of the PF scheduler as shown in FIG. 1A.

The scheduler 200 may also use only the first and third status variables 240-1 to 240-3 (($y_i(t)$, $q_i(t)$, and $z_i(t)$) to achieve the aim of the MLWDF scheduler 100-2 as shown in FIG. 1B.

Figure 4:
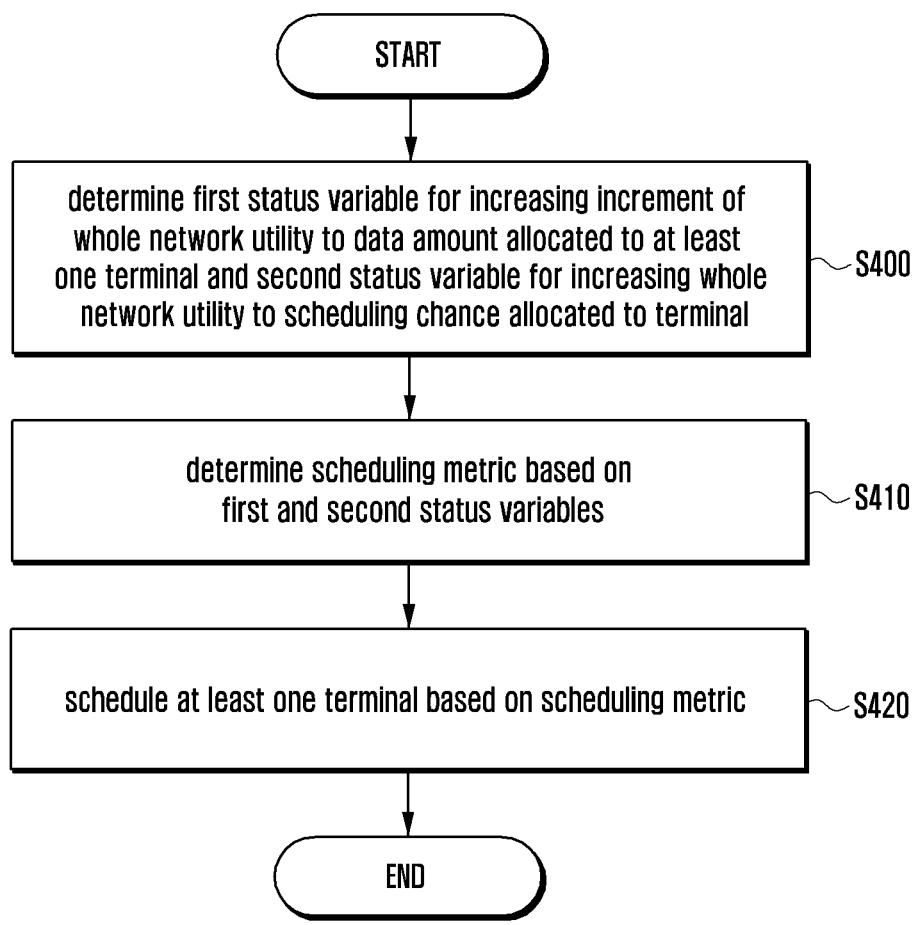
FIG. 4 is a flowchart illustrating a scheduling method of a base station according to an embodiment of the present disclosure.

FIG. 4 is a flowchart illustrating a scheduling method of a base station according to an embodiment of the present disclosure.

Referring to FIG. 4, the base station acquires the first status variable for increasing the increment of the whole network utility to the data amount allocated to at least one terminal and the second status variable for increasing the increment of the whole network utility to the scheduling chance allocated to the terminal at operation S400.

The base station may determine the scheduling metric based on the first and second status variables at operation S410.

The base station schedules at least one terminal based on the scheduling metric at operation S420.

A description is made in detail hereinafter with reference to FIG. 5 of the scheduling method of a base station.

Figure 5:
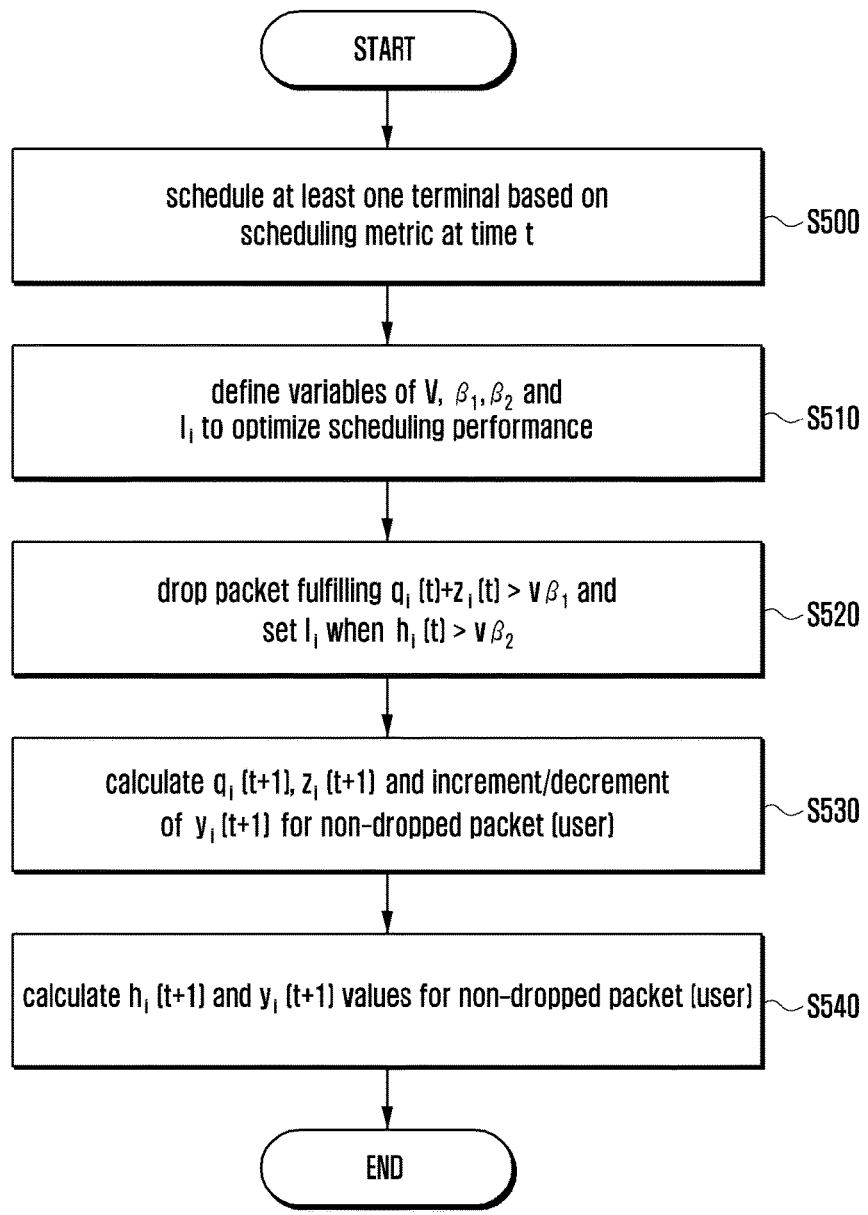
FIG. 5 is a flowchart illustrating a scheduling method of a base station according to an embodiment of the present disclosure.

FIG. 5 is a flowchart illustrating a scheduling method of a base station according to an embodiment of the present disclosure.

Referring to FIG. 5, the base station schedules at least one terminal based on the scheduling metric at time t at operation S500. For example, the base station may perform the scheduling such that the size of the scheduling metric value acquired by Equation 8 is proportional to the scheduling priority.

The base station may define variables of V, $\beta_i$, $\beta_2$, and $l_i$ to optimize the scheduling performance at operation S510. The variable V may denote the adjustment variable for determining priority between the QoS guarantee and resource allocation fairness.

At operation S520, the base station may drop the packet which fulfils $q_i(t)+z_i(t)>V\beta_1$ and sets $l_i$ when $h_i(t)>\beta_2$. $l_i$ is a variable for decreasing QoS condition which is set by the base station to optimize performance when it is difficult to fulfil the minimum data rate.

At operation S530, the base station may calculate $q_i(t+1)$, $z_i(t+1)$, and increment/decrement of $y_i(t+1)$ for the packet (user) which has not been dropped.

For example, the base station may increase, when the first status variable $y_i(t)$ is equal to or greater than the second status variable $q_i(t)$, the value of $q_i(t+1)$ and maintain, when the first status variable $y_i(t)$ is less than the second status variable $q_i(t)$, the value of $q_i(t+1)$. If terminal i is allocated resources at time t, the base station decreases the value of $q_i(t+1)$.

The base station may increase, when the terminal is not allocated resources at time t, the value of $z_i(t+1)$ and decrease, when the terminal is allocated resources at time t, the value of $z_i(t+1)$.

The base station may determine the increment of $y_i(t+1)$ which is proportional to V and inversely proportional to $y_i(t)-h_i(t)$ and the decrement of $y_i(t)-h_i(t)$ which is equal to the increment of $q_i(t+1)$.

At operation S540, the base station may calculate $h_i(t+1)$ and $y_i(t+1)$ values for the packet (user) which is not dropped.

For example, if the terminal i does not fulfil the minimum data rate at time t, the base station may control such that $h_i(t+1)$ for terminal i increases. If the terminal i does not fulfil the minimum data rate at time t, the base station may control such that the value of $h_i(t+1)$ decreases as much as the increment of $y_i(t+1)$ or, if li is defined, control such that the data rate decreases as much as li.

The base station may control to increase the value of $y_i(t+1)$ for $y_i(t)$ which is less than $q_i(t)$ and to decrease the value of $y_i(t+1)$ for $y_i(t)$ which is equal to or greater than $q_i(t)$.

Figure 6:
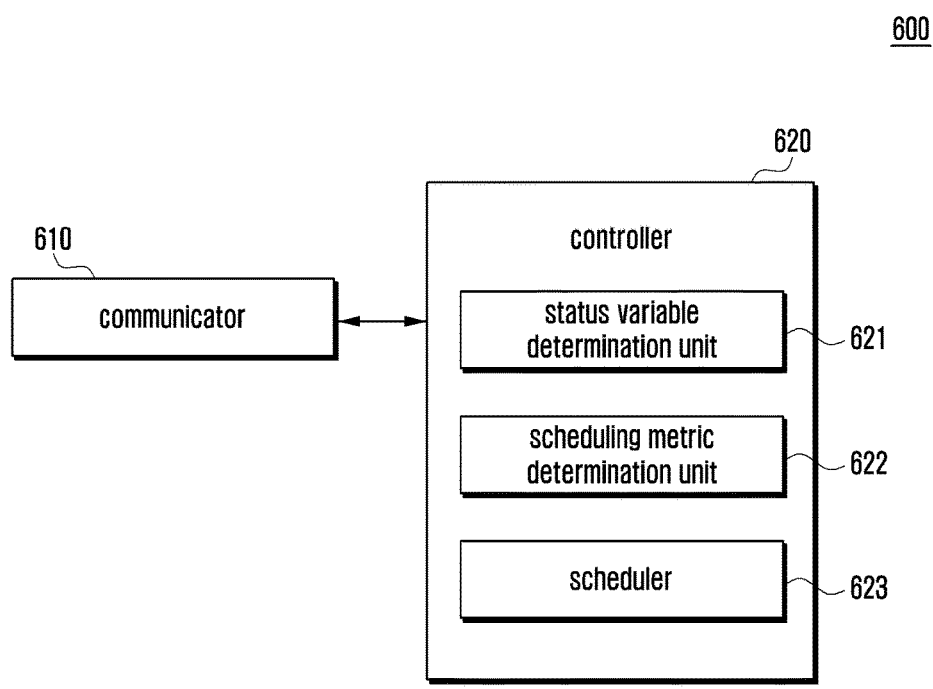
FIG. 6 is a block diagram illustrating a configuration of a base station for performing the above-described operations according to an embodiment of the present disclosure.

FIG. 6 is a block diagram illustrating a configuration of a base station for performing the above-described operations according to an embodiment of the present disclosure.

Referring to FIG. 6, the base station 600 may include a communicator 610 and a controller 620. The communicator 610 may communicate signals with at least one terminal and another base station.

The controller 620 may also control the overall operations of the base station 600. The controller 620 may further include a status variable determination unit 621, a scheduling metric determination unit 622, and a scheduler 623.

According to an embodiment of the present disclosure, the status variable determination unit 621 may determine a first status variable for the increment of the whole network utility to the data amount allocated to the terminal and a second status variable for the increment of the whole network utility to the scheduling chance to the terminal.

The scheduling metric determination unit 622 may determine the scheduling metric based on the first and second status variables. The scheduler 623 may schedule at least one terminal based on the determined scheduling metric.

The status variable determination unit 621 may determine the third status variable for the increment of the whole network utility to the resource amount allocated to reduce the packet delay of the terminal and the fourth status variable for the increment of the whole network utility to the throughput required for fulfilling the minimum data rate of the terminal.

At this time, the scheduling metric determination unit 622 may determine the scheduling metric based on the first to third status variables or the first to fourth status variables.

According to an embodiment of the present disclosure, the status variable determination unit 621, the scheduling metric determination unit 622, and the scheduler 623 may be implemented in the base station 600 or as separate hardware components outside the base station.

The components of the controller 620 may also be implemented in software. The controller 620 may further include a flash memory or another type of non-volatile memory. The non-volatile memory may store programs working as the status variable determination unit 621, the scheduling metric determination unit 622, and the scheduler 623.

The controller 620 may be implemented in different forms including a CPU and a random access memory (RAM). The controller 620 may copy the programs stored in the non-volatile memory and execute the copied programs to perform scheduling as described above.

The controller 620 may be one of a CPU, a microprocessor, a controller, a processor, and an operating system. The controller 620 of the base station 600 may be implemented in the form of a system-on-a-chip (SOC) or system on chip (SoC) along with other function modules of the base station 600 such as a transceiver.

The scheduling method of a base station according to various embodiments of the present disclosure may be coded in a software program so as to be stored in a non-transitory readable medium. The non-transitory readable medium may be mounted in various devices.

The non-transitory readable medium is a medium which stores data semi-persistently so as to be readable by a device rather than a medium which stores data transitorily such as a register, a cache, and a volatile memory. Examples of the non-transitory readable medium may include a compact disc (CD), a digital versatile disc (DVD), a hard disk, a blu-ray disc, a universal serial bus (USB) memory, a memory card, and a read only memory (ROM).

As described above, the scheduling method and apparatus of the present disclosure is advantageous in terms that a base station is capable of scheduling terminals efficiently in consideration of status variables corresponding to various types of QoS.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A scheduling method of a base station of a wireless communication system, the scheduling method comprising:
    determining to decrease a first status variable associated with an increment of throughput fairness quality of service (QoS) to data amount allocated to a terminal of a plurality of terminals, and increase a second status variable associated with an increment of the throughput fairness QoS to a scheduling chance allocated to the terminal, if the first status variable is equal to or greater than the second status variable, wherein the throughput fairness QoS is determined based on a sum of an average throughput corresponding to each of the plurality of terminals;
    determining to increase the first status variable and to maintain the second status variable if the first status variable is less than the second status variable;
    wherein the increment of the first status variable is determined based on an adjustment variable for determining a priority between QoS guarantee and equality according to a resource fairness and a difference between the first status variable and a fourth status variable;
    determining a scheduling metric based on the determined first status variable and the determined second status variable according to one of the determining; and
    scheduling the plurality of terminals based on the scheduling metric.

2. The scheduling method of claim 1, further comprising:
    determining a third status variable associated with an increment of throughput fairness QoS to resource amount allocated for reducing packet delay of the terminal,
    wherein the determining of the scheduling metric comprises determining the scheduling metric additionally in consideration of the third status variable.

3. The scheduling method of claim 2, further comprising:
    determining the fourth status variable associated with an increment of throughput fairness QoS to throughput required for fulfilling a minimum data rate of the terminal,
    wherein the determining of the scheduling metric comprises determining the scheduling metric additionally in consideration of the first to fourth status variable.

4. The scheduling method of claim 3, further comprising determining, if the terminal is scheduled based on the increased first status variable, to decrease the second status value variable.

5. The scheduling method of claim 3, wherein the determining of the fourth status variable comprises:

increasing, if the terminal fails to fulfill the minimum data rate, the fourth status variable; and
    decreasing, if the terminal fulfills the minimum data rate, the fourth status variable.

6. The scheduling method of claim 3, wherein the determining of the scheduling metric comprises calculating the scheduling metric using an Equation:

$$metric_i = (q_i(t) + z_i(t))\mu_i(t)$$

where $q_i(t)$ denotes the second status variable, $z_i(t)$ denotes the third status variable, and $\mu_i(t)$ denotes data amount to transmit at time t.

7. The scheduling method of claim 2, wherein the determining of the third status variable comprises:
    increasing, if the terminal is not allocated resources, the third status variable; and
    decreasing, if the terminal is allocated resources, the third status variable.

8. The scheduling method of claim 1, wherein the scheduling of the plurality of terminals comprises adjusting a size of the scheduling metric to be proportional to a scheduling priority.

9. A base station of a wireless communication system, the base station comprising:
    a communicator configured to transmit and receive signals; and
    a controller configured to:
        decrease a first status variable associated with an increment of throughput fairness quality of service (QoS) to data amount allocated to a terminal of a plurality of terminals, and increase a second status variable associated with an increment of the throughput fairness QoS to a resource allocated to the terminal if the first status variable is equal to or greater than the second status variable, wherein the throughput fairness QoS is determined based on a sum of an average throughput corresponding to each of the plurality of terminals,
        increase the first status variable and maintain the second status variable if the first status variable is less than the second status variable,
        determine the increment of the first status variable to be proportional to an adjustment variable for determining a priority between QoS guarantee and equality according to a resource fairness and inversely proportional to a difference between the first status variable and a fourth status variable, and
        determine, if the terminal is scheduled, to decrease the second status variable.

10. The base station of claim 9, wherein the controller is further configured to:
    determine a third status variable associated with an increment of the throughput fairness QoS to resource amount allocated for reducing packet delay of the terminal, and
    determine a scheduling metric in consideration of the first to third status variables.

11. The base station of claim 10, wherein the controller is further configured to:
    determine the fourth status variable associated with an increment of the throughput fairness QoS to throughput required for fulfilling a minimum data rate of the terminal, and
    determine the scheduling metric in consideration of the first to fourth status variables.

12. The base station of claim 11, wherein the controller is further configured to calculate the scheduling metric using an Equation:

$$\text{metric}_i = (q_i(t) + z_i(t))\mu_i(t)$$

where $q_i(t)$ denotes the second status variable, $z_i(t)$ denotes the third status variable, and $\mu_i(t)$ denotes data amount to transmit at time t.

13. The base station of claim 10, wherein the controller is further configured to:
   increase, if the terminal is not allocated resources, the third status variable, and
   decrease, if the terminal is allocated resources, the third status variable.

14. The base station of claim 9, wherein the controller is further configured to:
   increase, if the terminal fails to fulfill a minimum data rate, the fourth status variable, and
   decrease, if the terminal fulfills the minimum data rate, the fourth status variable.

15. The base station of claim 9, wherein the controller is further configured to adjust a size of a scheduling metric to be proportional to a scheduling priority.

* * * * *